United States Patent [19]
Jüntgen et al.

[11] 4,023,939
[45] May 17, 1977

[54] METHOD AND ARRANGEMENT FOR PURIFYING GASES

[75] Inventors: Harald Jüntgen; Karl Knoblauch, both of Essen; Horst Grochowski, Oberhausen; Jürgen Schwarte, Essen, all of Germany

[73] Assignee: Bergwerksverband GmbH, Essen, Germany

[22] Filed: Mar. 3, 1976

[21] Appl. No.: 663,262

[30] Foreign Application Priority Data

Mar. 5, 1975 Germany .......................... 2509470

[52] U.S. Cl. .......................................... 55/73; 55/79; 55/181; 55/390; 423/244
[51] Int. Cl.$^2$ .......................................... B01D 53/06
[58] Field of Search ............. 55/33, 34, 73, 74, 79, 55/99, 179, 189, 387, 390, 181; 423/244

[56] References Cited

UNITED STATES PATENTS

| | | | |
|---|---|---|---|
| 2,203,560 | 6/1940 | Ashley | 55/74 X |
| 3,023,836 | 3/1962 | Kasbohm et al. | 55/79 |
| 3,119,673 | 1/1964 | Asker et al. | 55/33 X |
| 3,263,400 | 8/1966 | Hoke et al. | 55/33 |
| 3,686,832 | 8/1972 | Hori et al. | 55/179 |

*Primary Examiner*—Frank A. Spear, Jr.
*Assistant Examiner*—Robert H. Spitzer
*Attorney, Agent, or Firm*—Michael J. Striker

[57] ABSTRACT

A gaseous substance such as a flue gas or a combustion gas contains an adsorbable impurity which is capable of undergoing an exothermic reaction in the presence of oxygen. The gaseous substance is passed into an adsorber via an inlet conduit. In the adsorber, the impurity in the gaseous substance is adsorbed therefrom. The purified gaseous substance is withdrawn from the adsorber therefrom. The purified gaseous substance is withdrawn from the adsorber via an outlet conduit and conveyed to an exhaust stack. The adsorption of the impurity, as well as the reaction thereof with oxygen in the adsorber, liberate heat. The liberated heat is conveyed from the adsorber by the gaseous substance which is being purified and, accordingly, no undue temperature increase, which may harm or even cause combustion of the adsorbent, occurs in the adsorber. The operation of purifying the gaseous substance is carried out at an underpressure so that, when passage of the gaseous substance through the adsorber is interrupted for some reason, currents of air tend to be drawn through the adsorber due to the suction effects generated in the inlet and outlet conduits. The currents of air constitute sources of fresh oxygen and, as a result, reaction of the adsorbed impurity can continue. The liberated heat is no longer removed, however, so that a drastic temperature increase will then occur in the adsorber. To avoid this, a pair of spaced butterfly valves is provided in both the inlet and outlet conduits. The butterfly valves close, although not with absolute gastightness, when the passage of the gaseous substance through the adsorber is interrupted. This reduces the suction effects. Air or an inert gas is admitted into the regions between the respective pairs of butterfly valves until a pressure on the order of atmospheric pressure has been reached in these regions. The air or inert gas serves as a sort of buffer which prevents the suction effects generated by the source of the gaseous substance and the exhaust stack from acting on the adsorber. Although the air or inert gas may leak into the adsorber until atmospheric pressure has been reached in the latter, any oxygen introduced in this manner is quickly used up so that only minimal temperature increases occur in the adsorber.

13 Claims, 1 Drawing Figure

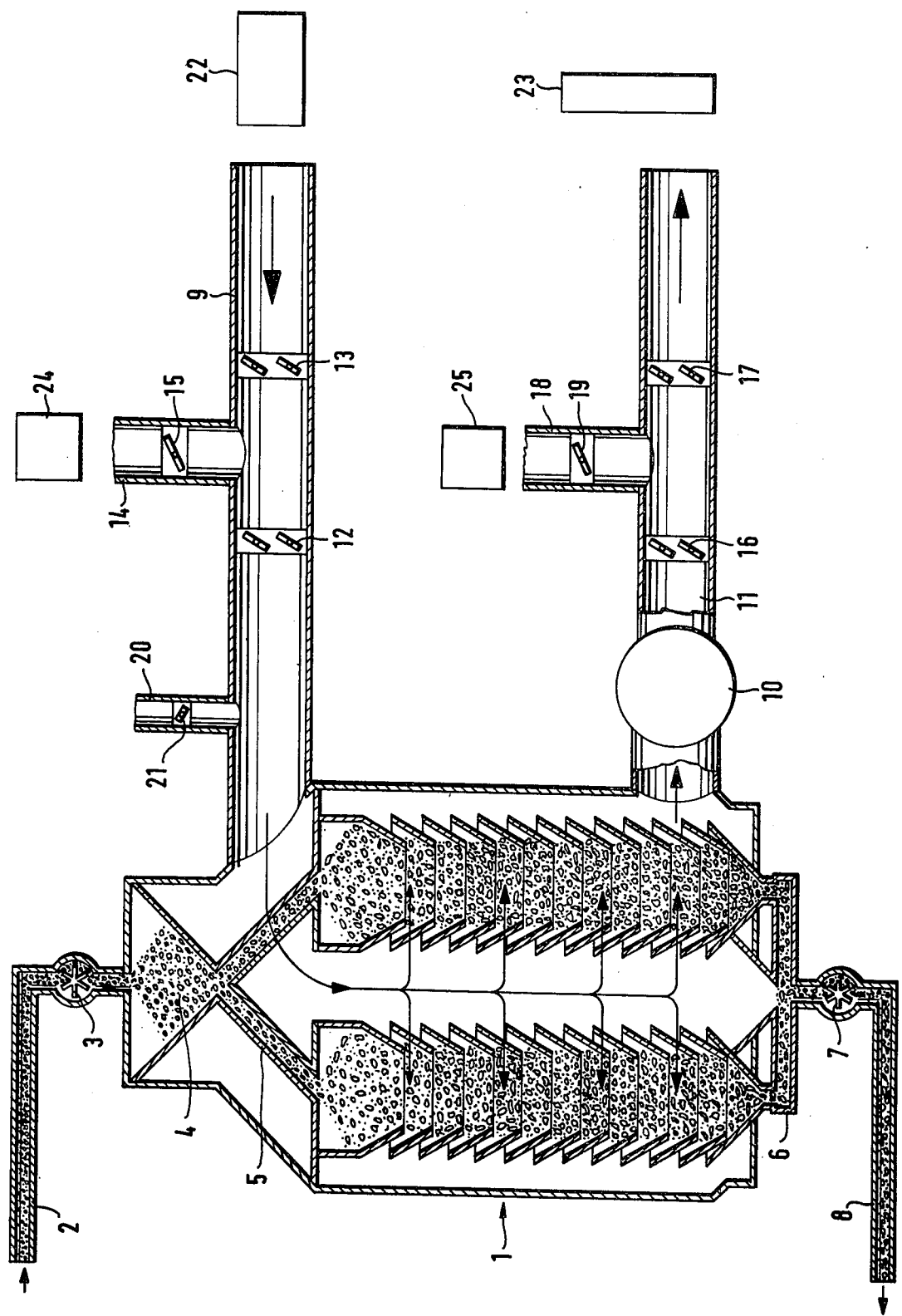

METHOD AND ARRANGEMENT FOR PURIFYING GASES

BACKGROUND OF THE INVENTION

The invention relates generally to the purification of gaseous substances. Of particular interest to the invention are a method and arrangement for the purification of gaseous substances using adsorption, and especially a method and arrangement for removing oxides of sulfur from waste gases at temperatures between about 80° and 160° C using carbonaceous adsorbents.

It is known that waste gases such as, for example, the combustion gases of power plants, may be desulfurized at temperatures between about 80° and 160° C by the adsorption of sulfur dioxide on carbonaceous adsorbents. In the adsorber, the adsorbed sulfur dioxide ($SO_2$) oxidizes to $SO_3$ which, in turn, leads to the formation of sulfuric acid. These reactions, as well as the adsorption process, liberate heat so that a temperature increase occurs in the adsorbent. During the operation of the apparatus in which the adsorption takes place, the liberated heat is removed from the adsorber by the flowing waste gases so that no substantial temperature increase occurs in the adsorbent.

When the adsorber is put out of operation, uncontrolled quantities of air are sucked into the adsorber. This is due to the fact that the adsorption process is carried out at subatmospheric pressures. Thus, since unavoidable leaks are present in the apparatus, and since the power plant and the exhaust stack through which the purified waste gases are exhausted generate a suction effect, currents of air will be drawn into the adsorber. These currents of air constitute a fresh source of oxygen and, as a result, reaction of the adsorbed sulfur dioxide continues. In turn, heat continues to be liberated in the adsorber. However, since the flow of the waste gases has been discontinued, the liberated heat is no longer being removed from the adsorber so that a temperature increase can occur in the adsorber. The temperature increase may be so large as to cause combustion of the carbonaceous material used as an adsorbent.

SUMMARY OF THE INVENTION

The invention intends to create a remedy for this problem and to provide a method and arrangement for the purification of gaseous substances using adsorption which enable harmful temperature increases in the adsorbent to be avoided when operation of the adsorbent is interrupted.

This object, as well as others which will become apparent as the description proceeds, are achieved in accordance with the invention. According to one aspect of the invention, there is provided a method of purifying a gaseous substance, e.g., a waste gas such as flue gas or power plant combustion gas, which contains an adsorbable component or impurity, e.g., sulfur dioxide, capable of undergoing exothermic reaction in the presence of oxygen when adsorbed upon an adsorbent. The method comprises conveying a stream of the gaseous substance along a path which includes an upstream section, a downstream section and an adsorption zone or adsorber for the adsorption of the adsorbable component intermediate the upstream and downstream sections. The conveying operation is carried out while maintaining subatmospheric pressures in the upstream and downstream sections of the path as well as in the adsorption zone. The stream of the gaseous substance is interrupted and thereafter a quantity of gas selected from the group consisting of air and inert gases (waste gases such as flue gases or power plant combustion gases, as well as other inert gases, may be used) is forcibly admitted into both the upstream and downstream sections of the path so as to raise the pressure in these sections of the path at least to the order of atmospheric pressure.

The raising of the pressures in the upstream and downstream sections of the path is effective for restricting the entry into the adsorption zone or adsorber of air currents due to leakage and suction effects so that the oxygen available in the adsorber and, resultantly, the extent of the exothermic reaction of the adsorbable component, are restricted and an undue temperature increase in the adsorber due to the exothermic reaction may be prevented.

The upstream section of the path along which the gaseous substance or waste gas flows may be located in an inlet conduit which communicates with the adsorber and with a source of the waste gas, e.g., a power plant. The downstream section of the path along which the waste gas flows may be located in an outlet conduit which communicates with the adsorber and with an exhaust stack, for instance.

Although the air or inert gas introduced into the upstream and downstream sections of the path, that is, into the inlet and outlet conduits, may be able to flow into the adsorber, such flow will continue only until the pressure interiorly of the adsorber reaches the pressure existing in the inlet and outlet conduits. This pressure is advantageously approximately equal to atmospheric pressure. After the pressure in the adsorber reaches the pressure in the inlet and outlet conduits, practically all air or inert gas admitted into the conduits will flow towards the exhaust stack. Any oxygen introduced into the adsorber during the period in which the pressure in the latter is being equalized with that in the inlet and outlet conduits is combusted or used in oxidation of the adsorbed impurity thereby causing a temperature increase in the adsorber. However, since the introduction of oxygen into the adsorber will be completely or almost completely terminated upon equalization of the pressures interiorly of the adsorber and the conduits, the temperature increase will be slight. The air or inert gas admitted into the inlet and outlet conduits serves as a sort of buffer which prevents the suction effects generated by the power plant and exhaust stack from having any substantial effect on the adsorber and, in particular, from continuously drawing currents of air into the adsorber through leaks or openings which exist in the adsorber. It is such continuous currents of air which, in the prior art, are responsible for the continued and dangerous oxidation of the adsorbed impurity subsequent to interruption of the flow of the waste gases through the adsorber. Thus, as mentioned earlier, since the heat generated by the oxidation is not removed from the adsorber when the flow of waste gases through the latter is interrupted, sharp temperature increases, which might harm the adsorbent, can occur in the adsorber.

As indicated previously, of special interest to the invention is a method of removing oxides of sulfur from waste gases by means of carbonaceous adsorbents. The adsorption is favorably carried out at temperatures between about 80° and 160° C.

Thus, a preferred aspect of the invention relates to a method of removing sulfur dioxide from waste gases which are conveyed through an adsorber charged with a carbonaceous adsorbent.

According to a particularly advantageous embodiment of the invention, the objects of the invention are achieved in that a pair of spaced valve members, e.g., butterfly valves, are provided in the conduit connecting the adsorber with the exhaust stack and in the conduit connecting the adsorber with the source of the waste gases, e.g., a power plant. The respective pairs of valve members are open during flow of the waste gases through the adsorber. Upon interruption of the stream of waste gases, the respective pairs of valve members are closed. Subsequently, either air or inert gas, which may be waste gas or some other inert gas, is admitted into the spaces existing between the respective closed pairs of valve members in order to provide for a pressure in these spaces which approximates atmospheric pressure.

In order to achieve the desired pressure in the spaces between the respective pairs of valve members, it is possible to provide a regulating device which, upon closing of the valve members, activates one or more blowers which admit air or inert gas into the intermediate spaces between the respective pairs of valve members until atmospheric pressure has been reached.

It has been further found that a favorable safety measure resides in that the pressure in the inoperative adsorber is increased to above atmospheric pressure by the direct introduction of inert gas separately from the air or inert gas which is admitted into the spaces between the respective pairs of valve members. Depending upon the circumstances, the pressure in the adsorber may be increased to a level which is only slightly above atmospheric pressure. The directly introduced inert gas makes it possible to avoid oxidation reactions of the carbon in an adsorber containing a carbonaceous adsorbent with even greater certainty than would be possible otherwise.

The invention also provides an arrangement for purifying a gaseous substance, e.g., a waste gas such as flue gas or power plant combustion gas, which contains an adsorbable component or impurity capable of undergoing exothermic reaction in the presence of oxygen when adsorbed on an adsorbent. The arrangement comprises means defining a flow path for the waste gas and the flow path includes an upstream section, a downstream section and an adsorption zone or adsorber intermediate these sections. Means is provided for conveying the waste gas along the flow path under conditions such that subatmospheric pressures are maintained in the upstream and downstream sections of the flow path as well as in the adsorber. The arrangement further comprises means for forcibly admitting gas into the upstream and downstream sections of the flow path so that, upon interruption of the flow of the waste gas along the flow path, the pressures in the upstream and downstream sections of the flow path may be raised to the order of atmospheric pressure. This enables the entry into the adsorber of air currents due to leakage and suction effects to be restricted whereby the oxygen available in the adsorber and, resultantly, the extent of the exothermic reaction of the adsorbed component, may be restricted and an undue temperature increase in the adsorber due to the exothermic reaction may be prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic representation of one embodiment of an arrangement in accordance with the invention which may be used for carrying out a method according to the invention.

DESCRIPTION OF THE PREFERRED EMBODIMENTS

Referring to the single FIGURE, it is noted that the reference numeral 1 identifies an adsorber. Some details of the adsorber 1 will be presented here not by way of limitation but, rather, in order to provide some perspective.

The adsorber 1 is of annular configuration and has an overall diameter of 2.75 meters. The interior of the adsorber 1 also has the form of an annulus and the diameter of the larger or outer ring of the internal annulus is 1.75 meters whereas the diameter of the smaller or inner ring of the internal annulus is 1 meter. The adsorber 1 has a height of 12 meters.

Three hundred cubic meters of a particulate carbonaceous adsorbent are slowly moved through the adsorber 1 from the top to the bottom thereof. The dwell time of the adsorbent in the adsorber 1 is 50 hours.

The adsorbent is conveyed into the adsorber 1 via a conduit 2. The adsorbent is passed into a charging device 3, which is here shown as being in the form of a bucket wheel, and is thereafter introduced into an admitting chamber 4. From the chamber 4, the adsorbent is fed into a conduit 5 of annular configuration which feeds the adsorbent into the annular interior of the adsorber 1.

The adsorbent moves downwardly through the adsorber 1 and, upon reaching the bottom of the latter, enters a conduit 6. From the conduit 6, the adsorbent is passed to a feeding member 7, which is here shown as being in the form of a bucket wheel. The feeding member 7 conveys the adsorbent into an outlet conduit 8 via which the adsorbent is discharged.

The waste gas to be purified in the adsorber 1 is obtained from a source 22 of waste gas. Although the source 22 is here assumed to be a power plant so that the waste gas is in the form of power plant combustion gas, it will be understood that the source 22 could be any suitable source of gas to be purified and that the waste gas could, for example, be in the form of flue gas.

From the source 22, the waste gas travels into a conduit 9 which communicates with the interior of the adsorber 1. The conduit 9 is provided with a pair of valve members 12 and a pair of valve members 13 which are in the form of butterfly valves in the illustrated embodiment. The valve members 12 and the valve members 13 are spaced from one another in longitudinal direction of the conduit 9. The valve members 12 and the valve members 13 are open when waste gas from the source 22 flows through the conduit 9.

A conduit 14 communicates with the interior of the conduit 9 intermediate the valve members 12 and 13, that is, the conduit 14 opens into the space between the valve members 12 and the valve members 13. The conduit 14 is provided with a valve member 15 which is here illustrated as being in the form of a butterfly valve. The valve member 15 is closed when waste gas from the source 22 flows through the conduit 9.

The conduit 14 is connected with a blower or compressor 24. The blower 24, in turn, communicates with a source of air such as the atmosphere or with a source of inert gas.

In addition to the conduit 14, a conduit 20 communicates with the interior of the conduit 9. The conduit 20 is provided with a valve member 21 which is here also illustrated as being in the form of a butterfly valve. Similarly to the valve member 15, the valve member 21 is closed when waste gas from the source 22 flows through the conduit 9. The conduit 20 communicates with a source of inert gas and a blower or compressor may be provided for admitting the inert gas from the conduit 20 into the conduit 9.

After passing through the conduit 9, the waste gas enters the adsorber 1. The waste gas flows through the adsorber 1 in a direction from top to bottom of the adsorber 1 and the manner in which the waste gas flows through the adsorber 1 is indicated schematically by the arrows in the adsorber 1. As the waste gas flows through the adsorber 1, the impurity or impurities which it is desired to remove from the waste gas are adsorbed by the particulate carbonaceous adsorbent moving downwardly through the adsorber 1. It will be assumed here that the waste gas contains oxides of sulfur and, in particular, sulfur dioxide, and that it is desired to remove the sulfur dioxide from the waste gas, that is, that it is desired to desulfurize the waste gas.

After having passed through the adsorber 1, the now-purified waste gas leaves the latter via a blower or compressor 10 which is installed in an outlet conduit 11. The conduit 11 leads to an exhaust stack 23 through which the purified waste gas may be exhausted into the atmosphere.

The conduit 11 is provided with a pair of valve members 16 and a pair of valve members 17 which are here illustrated as being in the form of butterfly valves. The valve members 16 and the valve members 17 are spaced from one another in longitudinal direction of the conduit 11. The valve members 16 and the valve members 17 are open when purified waste gas from the adsorber 1 flows through the conduit 11.

A conduit 18 communicates with the interior of the conduit 11 intermediate the valve members 16 and 17, that is, the conduit 18 opens into the space between the valve members 16 and the valve members 17. The conduit 18 is provided with a valve member 19 which is here shown as being in the form of a butterfly valve. The valve member 19 is closed when purified waste gas from the adsorber 1 flows through the conduit 11.

The conduit 18 is connected with a blower or compressor 25. The blower 25, in turn, communicates with a source of air such as the atmosphere or with a source of inert gas.

About 150,000 cubic meters of waste gas are conveyed through the adsorber 1 per hour. The temperature in the adsorbent is between 130° and 140° C. It will be understood that the values provided here are only exemplary.

In order to interrupt the desulfurization of the waste gas, the blower 10 is shut off. The valve members 12 and 13, as well as the valve members 16 and 17, are closed.

For a better understanding of the invention, it is mentioned here that valve members of the type illustrated do not, as a rule, close so as to be gastight. This is of significance for an understanding of the method according to the invention. It is further pointed out that the adsorption arrangement is operated at a certain underpressure. Depending upon the power plant, the adsorption arrangement may, for instance, be operated at a pressure corresponding to a water column having a height of 350 millimeters.

After the valve members 12 and 13, as well as the valve members 16 and 17, have been closed, the valve members 15 and 19 are opened. Thereafter, air or inert gas is blown into the space between the closed valve members 12 and 13, as well as the space between the closed valve members 16 and 17, via the conduits 14 and 18, respectively. In the illustrated embodiment, the air or inert gas is blown into these intermediate spaces by the two blowers 24 and 25. However, it is to be understood that a single blower could be provided in lieu of the two blowers 24 and 25 for blowing the air or inert gas into the intermediate spaces.

The blowers 24 and 25 feed air or inert gas into the intermediate spaces until the pressure in the intermediate spaces is on the order of atmospheric pressure, that is, the blowers 24 and 25 feed air or inert gas into the intermediate spaces in order to achieve atmospheric pressure therein. Favorably, the blowers 24 and 25 are regulated in dependence upon the internal pressure of the adsorber 1 in such a manner that they feed air or inert gas into the intermediate spaces for a period sufficient for the pressure in the intermediate spaces to reach the vicinity of atmospheric pressure. In this manner, it becomes possible to avoid the uncontrolled entry of air, which may cause dangerous temperature increases due to oxidation reactions, into the adsorber 1. The air or inert gas in the intermediate spaces serves as a sort of buffer between the adsorber 1 on the one hand and the power plant 22 and exhaust stack 23 on the other hand. In this connection, it may be pointed out that, if no means were provided for forcing air or inert gas into the conduits 9 and 11 and only the valve members 12 and 16 were present in these conduits, air would be sucked into the absorber 1 via the conduits 2 and 8 and sucked out of the adsorber 1 via the valve members 12 and 16. The continuous air currents which would be generated in the adsorber 1 in this manner are responsible for the dangerous oxidation leading to sharp temperature increases which may occur in the inoperative adsorbers of the prior art.

As mentioned earlier, the valve members 12 and 13, as well as the valve members 16 and 17, do not close with absolute gastightness. Therefore, the air or inert gas blown into the intermediate spaces enters the adsorber 1 through the valve members 12 and 16 in relatively significant amounts. Nevertheless, it is possible to blow air into the intermediate spaces instead of inert gas. This is based on the fact that the gas introduced into the intermediate spaces flows into the adsorber 1 only until atmospheric pressure is reached in the adsorber 1. As soon as atmospheric pressure is reached in the adsorber 1 or, more precisely, as soon as the pressure in the adsorber 1 reaches the pressure in the intermediate spaces, practically all of the gas introduced into the intermediate spaces will flow towards the power plant 22 and the exhaust stack 23. Thus, the major part of the gas introduced into the intermediate spaces will flow towards the power plant 22 and the exhaust stack 23. The oxygen initially introduced into the adsorber 1 when air is blown into the intermediate spaces will combust so that a temperature increase occurs in the adsorber 1. However, this temperature increase is slight and insignificant and the oxygen is soon used up or else enters the adsorber 1 in such small amounts that any temperature increases remain slight.

In the event that the nature of the adsorbent dictates that even a slight, transient increase in the temperature of the adsorbent should be avoided, or in the event that it is desirable to achieve a cooling or the adsorbent, inert gas such as, for example, nitrogen, may be introduced into the adsorber 1 via the conduit 20. In such a case, the valve member 21, which is otherwise closed, is shifted to its open position. The inert gas admitted via the conduit 20 is in addition to the gas which is introduced into the intermediate spaces via conduits 14 and 18. It is possible to increase the pressure in the adsorber 1 to above atmospheric pressure by the introduction of inert gas through the conduit 20 and, depending upon the circumstances, the pressure in the adsorber 1 may be increased to a value which is only slightly above atmospheric pressure.

Favorably, gas is admitted into the intermediate spaces of the conduits 9 and 11 in such a manner, at least for the embodiment of the invention where no inert gas is introduced via the conduit 20, that the pressures in the intermediate spaces are substantially equal. This is especially advantageous when air is admitted into the intermediate spaces. In the embodiment of the invention where inert gas is introduced via the conduit 20, the pressure in the conduit 9 may exceed that in the conduit 11.

Air should not be introduced through the conduit 20 since this may result in a significant temperature increase in the adsorber 1. The conduit 20 is foreseen since inert gas such as nitrogen is expensive. Thus, if the inert gas which it is contemplated to introduce via the conduit 20 were to be introduced via the conduit 14 or the conduit 18, relatively substantial amounts of the inert gas would be lost through the valve member 13 or the valve member 17. By admitting the inert gas through the conduit 20, these losses may be reduced.

In order to renew operation of the arrangement, that is, in order to once again provide for desulfurization of the waste gas, the valve members 15, 19 and 21 are closed. The blower 10 is again activated and the valve members 12 and 13, as well as the valve members 16 and 17, are opened.

It will be understood that each of the elements described above, or two or more together, may also find a useful application in other types of methods and constructions differing from the types described above.

While the invention has been illustrated and described as embodied in a method and an arrangement for desulfurizing combustion gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of purifying a gaseous substance which contains an adsorbable component capable of undergoing exothermic reaction in the presence of oxygen when adsorbed upon an adsorbent, comprising conveying a stream of said gaseous substance along a path which includes an upstream section, a downstream section and an adsorption zone for the adsorption of said component intermediate said sections, said conveying being carried out while maintaining subatmospheric pressures in said upstream and downstream sections of said path and in said adsorption zone; interrupting said stream of said gaseous substance; and thereafter forcibly admitting a quantity of gas selected from the group consisting of air and inert gases into each of said upstream and downstream sections of said path so as to raise the pressures in said sections of said path at least to the order of atmospheric pressure, said raising of the pressures being effective for restricting the entry into said adsorption zone of air currents due to leakage and suction effects so that the oxygen available in said adsorption zone and, resultantly, the extent of said exothermic reaction, are restricted and an undue temperature increase in said adsorption zone due to said exothermic reaction may be prevented.

2. A method as defined in claim 1, said upstream section having an upstream end and said downstream section having a downstream end; and wherein said ends are partially blocked when said stream is interrupted so as to reduce suction effects in said adsorption zone and said upstream and downstream sections of said paths, at least part of said gas being admitted into said upstream section downstream of said end thereof, and at least part of said gas being admitted into said downstream section upstream of said end thereof.

3. A method as defined in claim 2, said upstream section of said path having a downstream end, and said downstream section of said path having an upstream end; and wherein said downstream end of said upstream section and said upstream end of said downstream section are partially blocked when said stream is interrupted so as to further restrict suction effects in said adsorption zone, at least part of said gas being admitted into said upstream section intermediate said ends thereof, and at least part of said gas being admitted into said downstream section intermediate said ends thereof.

4. A method as defined in claim 3, said upstream section of said path communicating with a combustion zone, and said downstream section of said path communicating with an exhaust stack; and wherein said gaseous substance includes the combustion products from said combustion zone and said component is sulfur dioxide, said adsorption zone comprising a carbonaceous adsorbent, and said gas including a member of the group consisting of air, flue gases and combustion engine exhaust gases.

5. A method as defined in claim 1, wherein said gaseous substance comprises a member of the group consisting of flue gases and power plant combustion gases.

6. A method as defined in claim 1, wherein said gas comprises a member of the group consisting of air, flue gases and power plant combustion gases.

7. A method as defined in claim 1, said gas entering said adsorption zone and raising the pressure therein to at most atmospheric pressure; and wherein an additional quantity of gas in the form of inert gas is introduced into said adsorption zone so as to increase the pressure therein to above atmospheric pressure and further restrict said exothermic reaction.

8. A method as defined in claim 7, wherein said additional gas quantity increases the pressure in said adsorption zone to a level which is only slightly above atmospheric pressure.

9. An arrangement for purifying a gaseous substance which contains an adsorbable component capable of undergoing exothermic reaction in the presence of oxygen when adsorbed on an adsorbent, comprising means defining a flow path for the gaseous substance, said flow path including an upstream section, a downstream section and an adsorption zone intermediate said sections, and said means comprising an inlet conduit which includes said upstream section and an outlet conduit which includes said downstream section, said inlet conduit being provided with a first valve member at an upstream end of said upstream section and with a second valve member at a downstream end of said upstream section, and said outlet conduit being provided with another valve member at a downstream end of said downstream section and with an additional valve member at an upstream end of said downstream section, said valve members having open positions for permitting flow of the gaseous substance along said flow path, and said valve members also having non-gas-tight closed positions to permit suction effects in said adsorption zone and said upstream and downstream sections of said flow path to be reduced when flow of the gaseous substance along said flow path is interrupted; means for conveying the gaseous substance along said flow path under conditions such that subatmospheric pressures are maintained in said upstream and downstream sections thereof and in said adsorption zone; and means for forcibly admitting gas into said upstream and downstream sections of said flow path so that, upon interruption of the flow of the gaseous substance along said flow path, the pressures in said upstream and downstream sections may be raised to the order of atmospheric pressure so as to restrict the entry into said adsorption zone of air currents due to leakage and suction effects, whereby the oxygen available in said adsorption zone and, resultantly, the extent of exothermic reaction of the adsorbed component, may be restricted and an undue temperature increase in said adsorption zone due to the exothermic reaction may be prevented, said admitting means including first admitting means arranged to admit gas into said inlet conduit intermediate said first and second valve members, and said admitting means including second admitting means arranged to admit gas into said outlet conduit intermediate said other and additional valve members.

10. An arrangement as defined in claim 9, wherein said first and second admitting means each comprise an admitting conduit opening into said inlet and outlet conduits, respectively; and valve members in said admitting conduits.

11. An arrangement as defined in claim 10, said adsorption zone comprising a carbonaceous adsorbent; and wherein said inlet conduit communicates with a combustion zone and said outlet conduit communicates with an exhaust stack.

12. An arrangement as defined in claim 9, comprising additional admitting means for admitting inert gas into said adsorption zone so as to permit the exothermic reaction of the adsorbed component to be further restricted.

13. An arrangement as defined in claim 9, said admitting means comprising at least one blower for blowing gas into said upstream and downstream sections of said flow path; and wherein said one blower is operative for admitting gas into said upstream and downstream sections of said flow path in dependence upon the pressure existing interiorly of said adsorption zone.

* * * * *